United States Patent [19]
Morrison

[11] Patent Number: 5,603,178
[45] Date of Patent: Feb. 18, 1997

[54] ORNAMENTAL COVER FOR TRAILER HITCH SOCKET

[75] Inventor: Arthur M. Morrison, Puyallup, Wash.

[73] Assignee: Motorsport Accessories, Inc., Tacoma, Wash.

[21] Appl. No.: 365,027

[22] Filed: Dec. 27, 1994

[51] Int. Cl.$^6$ .................................................. B60D 7/00
[52] U.S. Cl. ........................................... 40/591; 280/507
[58] Field of Search ................... 40/591, 590; 280/507, 280/511

[56] References Cited

U.S. PATENT DOCUMENTS

| | | | |
|---|---|---|---|
| 3,271,050 | 9/1966 | Saunders | 280/507 |
| 3,782,761 | 1/1974 | Cordin, Sr. | 280/507 |
| 3,889,981 | 6/1975 | Westford | 280/507 |
| 4,906,015 | 3/1990 | LaCroix et al. . | |
| 4,938,399 | 7/1990 | Hull et al. . | |
| 5,092,503 | 3/1992 | Cocks . | |
| 5,106,002 | 4/1992 | Smith et al. . | |

FOREIGN PATENT DOCUMENTS 2029621  3/1980  United Kingdom ..................... 40/591

*Primary Examiner*—Brian K. Green
*Assistant Examiner*—Cassandra Davis
*Attorney, Agent, or Firm*—Kolisch, Hartwell, Dickinson, McCormack & Heuser

[57] ABSTRACT

The ornamental cover is installed on a rectangular, tubular trailer hitch socket for substantially covering or concealing the otherwise undecorated opening of the hitch socket. The cover is configured to be quickly and easily installed over and partly within the opening of any standard frame-mounted hitch socket, thereby improving the aesthetic appeal of the rear of a vehicle so equipped.

In the preferred embodiment, the cover includes a plate that includes an outer surface bearing user-selected ornamentation and an insert extending from the center of the inner surface of the plate. The insert is dimensioned for insertion into a standard rectangular hitch socket. An ear extends from the insert and away from the plate for securing the cover partly within the socket. The ear is offset from the center of the insert so that when the cover is installed the ear extends substantially parallel to and adjacent an interior wall of the socket. The ear has a circular bore formed therein, into which an internally threaded nutsert is press fitted. The ornamental cover is firmly secured to the hitch socket by a round, Allen-headed fastener that extends through a hole in a wall of the hitch socket and threadedly engages the nutsert.

15 Claims, 2 Drawing Sheets

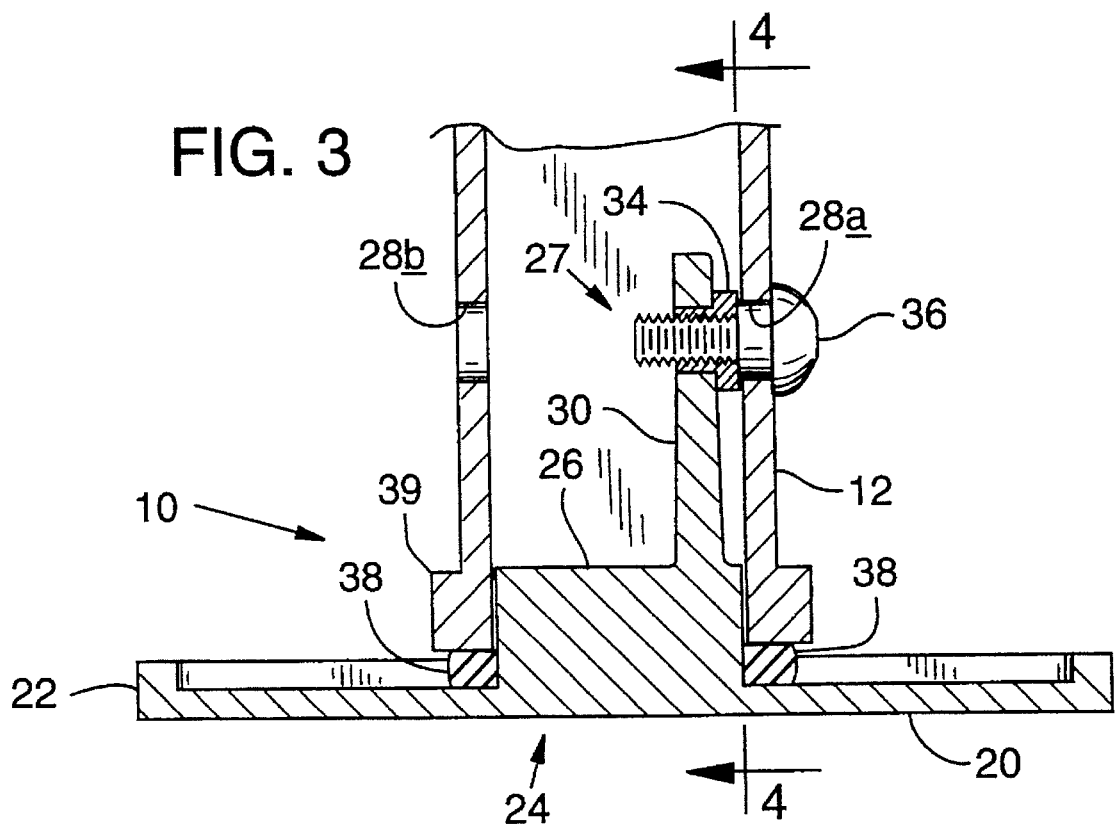
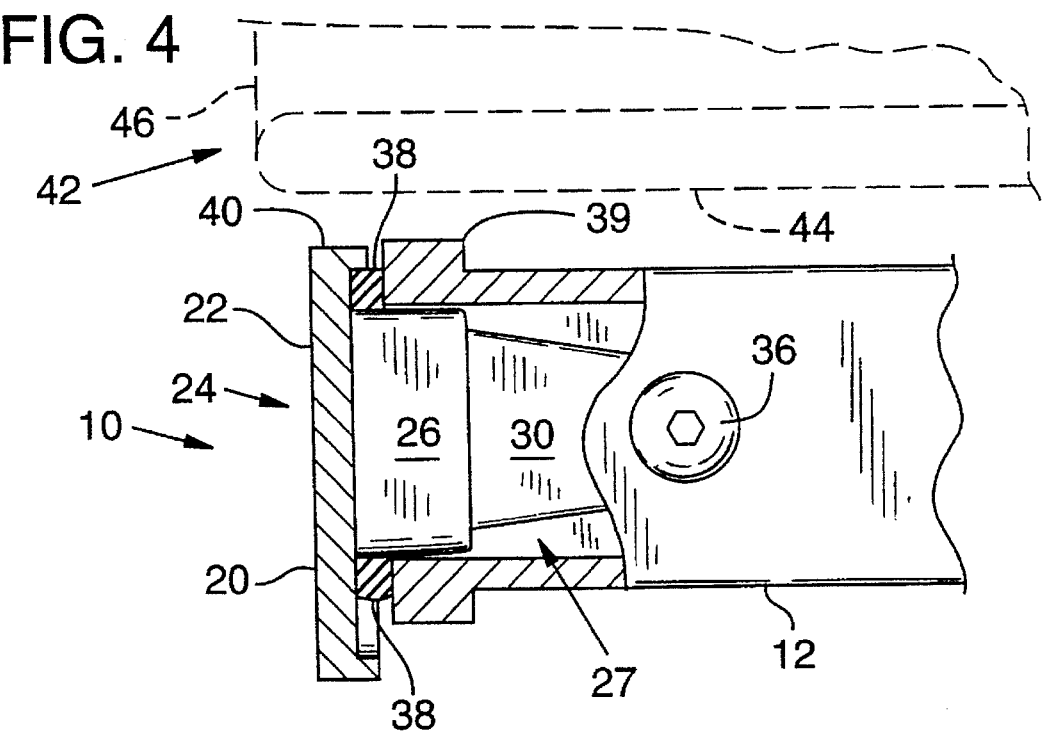

ORNAMENTAL COVER FOR TRAILER HITCH SOCKET

FIELD OF THE INVENTION

The present invention relates generally to decorative automobile accessories that attach to an automobile's trailer hitch socket. More particularly, the invention concerns an ornamental cover that is installable in a vehicle's trailer or accessory hitch socket and that substantially covers and effectively decorates the hitch socket's opening when the socket is not otherwise in use.

BACKGROUND OF THE INVENTION

Automobiles or vehicles such as cars, pick-up trucks, vans, recreational vehicles (RVs) and sports utility vehicles are often used to pull trailers. They may pull a boat, a cargo trailer, or some other type of load. They also may carry accessories such as motorcycle or wheelchair lifts, toolboxes and the like. Two of the most common means by which trailers or accessories attach to a vehicle are 1) a vehicle frame-mounted ball-and-socket drop hitch and 2) a vehicle frame-mounted rectangular, tubular hitch socket which may receive a removable ball-and-socket hitch accessory therein. Usually, such hitch-receiving equipment is mounted underneath the bumper toward the rear of the vehicle in order to facilitate the towing of hitched trailers.

The hitch socket is rectangular, and usually square, and includes a hole that is dimensioned in cross section to receive therein a trailer's or accessory's elongate mounting hitch, or so-called "tongue". An operator secures the hitch by inserting a pin or bolt through four laterally aligned holes formed in the tongue and hitch socket.

An unused or open hitch socket may be found to be subjectively unattractive. But, much of the time, the vehicle operator has no need to tow a trailer or to carry an accessory. Accordingly, the primary purpose of the invention is to cover or substantially cover the ordinarily unappealing opening of the hitch socket with a decorative body or element having an interesting or attractive shape, color, picture, message, or otherwise visibly decorative characteristic.

SUMMARY OF THE INVENTION

The invention in a preferred embodiment takes the form of an ornamental cover installed on a rectangular, tubular trailer hitch socket for substantially covering or concealing the otherwise undecorated and somewhat unappealing opening of the hitch socket. The invented cover is configured to be quickly and easily installed over and partly within the opening of any standard frame-mounted hitch socket, thereby improving the aesthetic appeal of the rear of a vehicle so equipped.

In the preferred embodiment, the invented cover includes a broad, flat planar expanse, or plate that includes an outer surface bearing user-selected ornamentation such as a user-selected message or decorative element. The ornamental cover preferably includes an insert extending from the center of the inner surface of the plate (the surface opposite the outer surface displaying the message or the decorative element). The insert is dimensioned for insertion into the standard square, e.g. 2"×2", or non-square rectangular, e.g. 1"×2", hitch socket. Preferably, the insert is a plug that is substantially coextensive with the socket's opening when inserted therein. The ornamental cover preferably is provided with a neoprene gasket formed to fit around the insert and against the inner surface of the plate to provide a snug, rattle-free fit when the cover is installed.

An ear-like securement member, or simply ear, extends from the insert and away from the plate for securing the cover partly within the socket. The ear is offset from the center of the insert so that when the cover is installed the ear extends substantially parallel and adjacent an interior wall of the socket. The ear has a bore, or circular hole, formed therein into which an internally threaded member—sometimes called a nutsert—is press fitted. The ornamental cover is firmly secured to the hitch socket by a round, Allen-headed fastener that extends through a hole in a wall of the hitch socket and threadedly engages the nutsert. The user may remove the ornamental cover by removing the fastener with an Allen wrench of the appropriate size.

Other than aesthetics, an additional practical advantage of the invented cover is stopping the unwanted introduction of contaminants, such as mud and dirt, into the hitch socket through the opening.

These and other additional objects and advantages of the present invention will be more readily understood after a consideration of the drawings and the detailed description of the preferred embodiment.

BRIEF DESCRIPTION OF THE DRAWINGS

FIG. 3 is a fragmentary, cross-sectional plan view of the cover installed in the hitch socket.

FIG. 4 is a fragmentary, partial, cross-sectional side view of the cover installed in the hitch socket that is taken generally along line 4—4 of FIG. 3.

DETAILED DESCRIPTION OF THE PREFERRED EMBODIMENT

Figure 1:
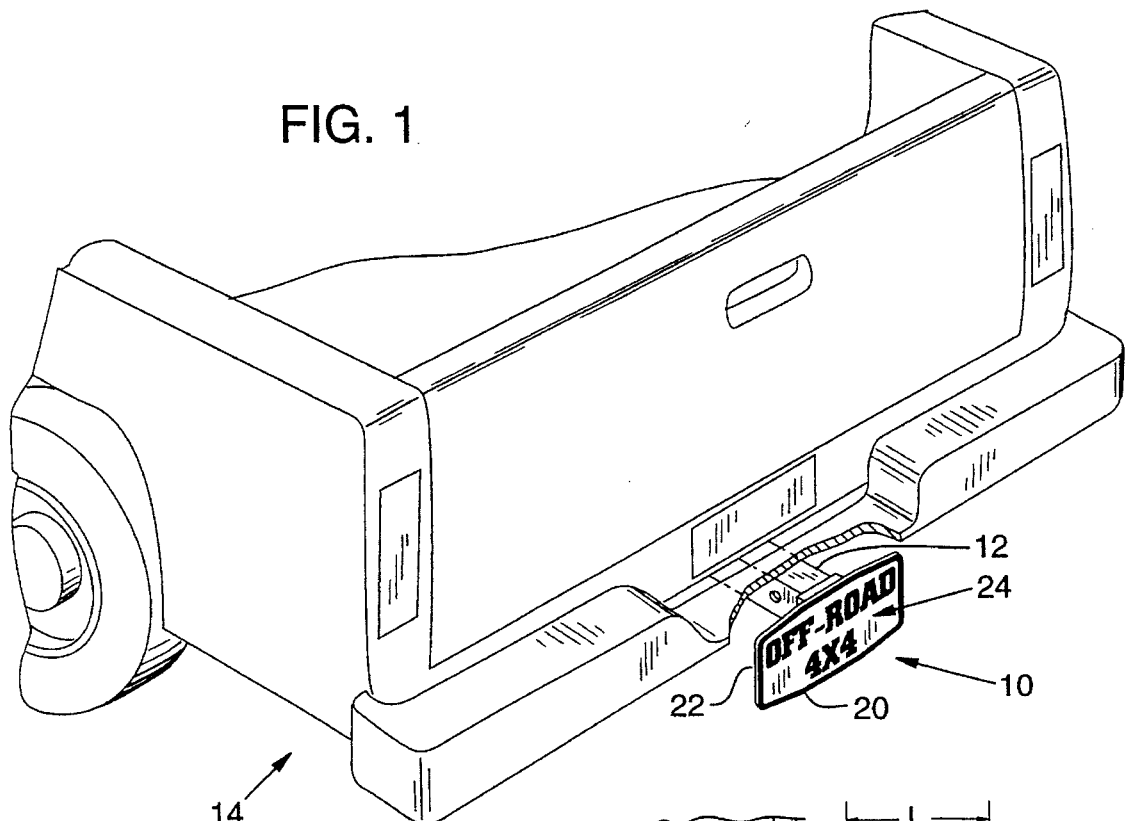
FIG. 1 is a fragmentary, perspective view of the rear of a pick-up truck with the bumper partially cut away to show the preferred embodiment of the invented cover bearing an illustrative message.

As seen collectively in FIGS. 1 through 4, an ornamental cover for a rectangular hitch socket, made in accordance with the preferred embodiment of the invention, is shown at 10. Ornamental cover 10 includes a decorative body or member 20 which is attached to a rectangular, tubular hitch socket 12 mounted in turn to the frame of a vehicle 14 (typically, beneath the vehicle's bumper). The hitch socket has an opening 16 for receiving a tongue of a trailer or another accessory therein. When a tongue is not installed, the opening is exposed and may be considered by some to be somewhat unattractive. Therefore, decorative body 20 attaches to socket 12 in such a way as to substantially cover or substantially conceal opening 16 of the socket.

FIG. 1 shows a fragmentary view of the tail end of vehicle 14 having a bumper. The bumper is shown cut away to expose socket 12 to which decorative body 20 is attached. FIG. 1 shows decorative body 20 bearing an exemplary decorative element 24 displaying an illustrative message: "OFF-ROAD 4×4". Those who are skilled in the art will appreciate that neither decorative body 20 nor decorative element 24 is limited to the illustrative message or any other particular message for that matter. Decorative body 20 or decorative element 24 may include any decorative message, shape, color, texture, art, hieroglyphic or other subjectively pleasing characteristic without departing from the spirit and scope of this invention.

Preferably, invented cover 10 includes decorative body 20 and a connector 27 attached thereto. The decorative body includes a flat, broad expanse, or plate 22 bearing decorative element 24 on a first or outer surface of the plate. Those who are skilled in the art will realize that plate 22 is not limited to a flat, broad simple geometric shape (as illustrated in FIG. 1), but that it may be any three-dimensional shape, texture, topology or form without departing from the spirit and scope of the invention.

Figure 2:
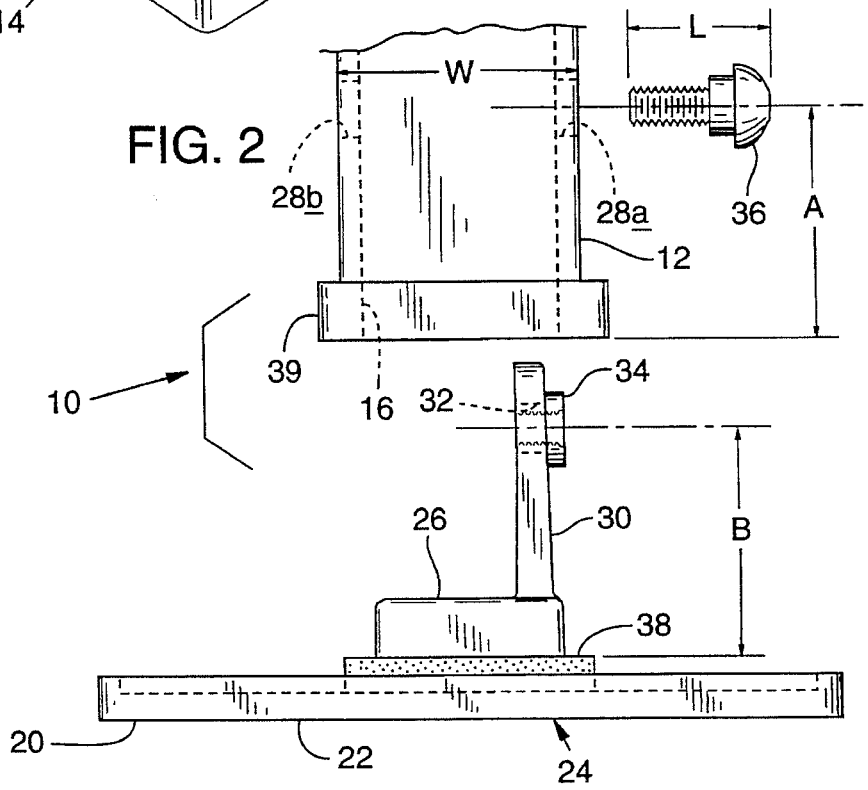
FIG. 2 is a fragmentary, exploded assembly plan view of the cover and the hitch socket.

In the preferred embodiment of the invention, plate 22 attaches to hitch socket 12 by a rectangularly-shaped insert or plug 26 which is dimensioned to fit within opening 16. Insert 26 fits into socket 12 so that decorative element 24 on the plate's outer surface faces away from the vehicle (as shown in FIG. 1). FIGS. 2 through 4 show that when plug 26 is inserted into opening 16, the plug is substantially coextensive in both cross-sectional dimensions with the opening.

As shown in FIGS. 2 and 3, the walls of hitch socket 12 include a pair of laterally aligned holes 28a, 28b. These standard holes are designed to receive a standard hitch bolt or pin. A user extends the hitch pin through holes 28a, 28b and also through two laterally aligned holes in the tongue of a trailer or an accessory. Preferably, the invention includes a tapered, elongate ear 30 extending from insert 26 with a transverse circular hole, or bore 32 corresponding with the socket's pair of holes 28a, 28b. Ear 30 has a length sufficient for bore 32 to be alignable with the pair of holes 28a, 28b, it is located adjacent one of the walls of hitch socket 12, and it extends off-center from insert 26. An internally threaded member, or nutsert 34 is press fitted within bore 32 and a threaded fastener 36 is inserted through hole 28a of the wall adjacent ear 30 and threaded through nutsert 34, thereby securing the ear within the hitch socket and the cover thereover.

Attached to decorative body 20 is connector or connecting mechanism 27 for installing or securing the decorative body to the hitch socket. In the preferred embodiment of the invention, the connector includes at least insert 26, ear 30 and fastener 36. However, those who are skilled in the art will appreciate that the decorative body may attach to the hitch socket by using a connector which includes elements other than an insert, an ear and a fastener without departing from the spirit and scope of the invention. For example, a clamp may be used to clamp the decorative body to the hitch socket, a collar may be fitted around the outside of the hitch socket, an adhesive substrate may be used to adhere or stick the decorative body to the hitch socket, or other connectors and the like may be used.

As shown in FIG. 2, fastener 36 has an overall length L that is less than width W of the hitch socket. Safety is the key advantage of limiting the fastener's length to less than the width of the socket. Because of its relatively short length, users are effectively prevented from using fastener 36—which is not designed to support heavy loads—as a means of securing a tongue of a trailer or an accessory.

Preferably, fastener 36 is an Allen screw or an Allen-headed screw. If fastener 36 were a standard flat-head or phillips-head screw, then the ornamental cover could be quickly and easily stolen by anyone with a standard screwdriver. Limiting access to those with the particular Allen wrench designed to work with the corresponding Allen screw adds an element of security against theft of the invented cover.

The decorative body also has a spacer or gasket 38 formed to fit around the periphery of insert 26 and between an inner surface of plate 22 and hitch socket 12. The gasket prevents contact between the ornamental cover and the hitch socket. Gasket 38 is malleable for sealing engagement between the plate and the hitch socket. In the preferred embodiment of the invention, the gasket is formed from neoprene. However, the gasket can be formed from other suitable, compressible or malleable material without departing from the spirit and scope of the invention. When decorative body 20 is attached to hitch socket 12, it is preferable that plate 22 be adjacent opening 16 of the socket in such a way as to substantially or significantly cover or conceal the opening. A compressible gasket 38 helps prevent contact between the plate and the hitch socket, thereby eliminating rattle caused by the vibrations of an operating vehicle.

Moreover, when the cover is attached to the socket, the plate slightly compresses gasket 38 against the socket. A peripheral collar 39 is located at the extreme terminal end of hitch socket 12 (and opening 16). As shown in FIG. 2, A is the distance between the center of hole 28a and peripheral collar 39 of hitch socket 12 and B is the distance between the center of nutsert 34 and the planar annular surface of uncompressed gasket 38 that faces the socket. To ensure compression of the gasket, distance A should be slightly greater than distance B (A>B). The compression of the gasket somewhat limits the movement of the cover, prevents the plate and the insert from touching the socket, and eliminates a potentially annoying audible rattle caused by vibrating contact between cover 10 and hitch socket 12.

As seen in FIG. 4, insert 26 is located on the inner surface of plate 22 such that a top edge 40 of the plate clears bumper 42 of the vehicle. Top edge 40 of the plate is preferably level with, or slightly below (i.e., it is approximately below) a horizontal plane defined by a bottom surface 44 of bumper 42. This arrangement prevents the bumper from interfering with or blocking the attachment of the ornamental cover to the hitch socket. Additionally, plate 22 is preferably located relative to insert 26 such that the outer surface of the plate faces a vertical plane that includes a rear edge 46 of bumper 42. This arrangement allows the bumper to protect the ornamental cover from damage if the vehicle is struck from behind.

Other than aesthetics, an additional practical advantage of the invented cover is stopping the unwanted introduction of contaminants, such as mud and dirt, into the hitch socket through the opening.

Preferably, the plate, insert and ear of the invented cover are an integral casting formed from aluminum or plastic in a mold. The nutsert and the fastener may be formed from a metal, a polymer or any other suitable material that is sufficiently rigid and sturdy to hold the cover within the socket. However, any manufacturing methods and materials may be used within the spirit and scope of the invention.

While the present invention has been shown and described with reference to the foregoing preferred embodiment, it will be apparent to those skilled in the art that other changes to form and detail may be made therein without departing from the spirit and scope of the invention as defined in the appended claims.

I claim:

1. An ornamental cover for use with a hitch socket of a vehicle, wherein the hitch socket includes an opening configured to receive a tongue therein and a wall with a hole therethrough, the ornamental cover comprising:

a decorative body configured for affixation to the hitch socket, wherein the decorative body includes:

a plate with a first surface and an insert connected to the plate and fittable into the opening of the hitch socket so that the plate's first surface faces away from the hitch socket when the insert is fitted into the opening of the hitch socket, and an elongate ear extending from the insert and being insertable within the hitch socket, the ear having a bore therethrough configured to receive an external, removable fastener to affix the ear within the hitch socket and against the wall when the insert is fitted into the hitch socket, and an internally threaded nutsert fitted within the bore, wherein the fastener may be threaded through the nutsert.

2. The ornamental cover of claim 1, further comprising a threaded fastener, for threaded engagement with the nutsert.

3. The ornamental cover of claim 1, further comprising a threaded Allen screw, wherein the screw is received by the bore to affix the ear within the hitch socket and against the wall when the insert is fitted into the hitch socket.

4. The ornamental cover of claim 1, further comprising an elongate fastener, wherein the insert has a width sized to fit into the hitch socket and the elongated fastener has a length not greater than the width of the insert.

5. The ornamental cover of claim 1, wherein the decorative body includes a spacer disposed adjacent the insert to prevent contact between the plate and the hitch socket when the insert is fitted into the hitch socket.

6. The ornamental cover of claim 5, wherein the spacer is compressible for sealing engagement between the plate and the hitch socket when the insert is fitted into the hitch socket.

7. An ornamental cover for adorning a vehicle, wherein the vehicle has a hitch socket including an opening configured to receive a tongue therein and a wall with a hole therethrough, the ornamental cover comprising:

a decorative member, and a connector mechanism connected to the decorative member and configured to attach the decorative member to the hitch socket, such that the decorative member substantially conceals the opening when the decorative member is attached to the hitch socket, wherein the connector mechanism includes:

a plate with a first surface and an insert connected to the plate and fittable into the opening of the hitch socket so that the plate's first surface faces away from the hitch socket when the insert is fitted into the opening of the hitch socket;

an elongate ear extending from the insert and being insertable within the hitch socket, the ear having a bore therethrough configured to receive an external, removable fastener to affix the ear within the hitch socket; and an external, removable fastener extendable through the hole in the wall of the hitch socket and through the bore of the ear, so that the fastener may affix the ear within the hitch socket and against the wall when the insert is fitted into the opening of the hitch socket, and an internally threaded nutsert fitted within the bore, wherein the fastener may be threaded through the nutsert.

8. An ornamental cover for installation to a hitch socket of a vehicle, wherein the hitch socket has a width and projects horizontally from the vehicle and is configured with a rectangular opening for receipt of a tongue of an accessory therein, and also includes a wall with a hole therethrough, and the hitch socket has a width, the ornamental cover comprising:

a plate with a first surface;

a decorative element on the plate's first surface;

an insert connected to the plate and fittable into the opening, wherein the insert is rectangular in shape and is dimensioned to fit within the opening;

an elongate ear extending from the insert and being insertable into the hitch socket, the ear having a bore therethrough and an external, removable fastener removably received therein to affix the ear within the hitch socket when the ear is inserted into the hitch socket; and an external, removable fastener extendable through the hole in the wall of the hitch socket and through the bore of the ear, so that the fastener may affix the ear within the hitch socket and against the wall when the insert is fitted into the hitch socket, and an internally threaded nutsert fitted within the bore, wherein the fastener may be threaded through the nutsert.

9. The ornamental cover of claim 8, wherein the insert is a plug adapted to be substantially coextensive with the opening of the hitch socket when the plug is fitted into the opening.

10. The ornamental cover of claim 8, wherein the fastener has a length which is less than the width of the hitch socket.

11. The ornamental cover of claim 8 further comprising a spacer extending around a periphery of the insert to prevent contact between the plate and the hitch socket, when the cover is attached thereto.

12. The ornamental cover of claim 11, wherein the spacer is malleable for sealing engagement between the plate and the hitch socket, when the cover is attached thereto.

13. The ornamental cover of claim 8, further comprising:

a compressible spacer around the insert, the spacer including an edge and a planar surface farthest from the plate, wherein:

the hole in the wall of the socket and the opening of the hitch socket is a first predefined distance;

the bore in the ear and the edge of the spacer define a second predefined distance therebetween; and the first predefined distance is adapted to be greater than the second predefined distance, so that the spacer compresses between the plate and the socket when the cover is installed in the hitch socket, thereby reducing vibrating contact between the cover and the hitch socket.

14. A vehicle having an ornamental attachment comprising:

a hitch socket defined by at least one wall, the socket including a hollow opening for receiving an accessory therein and a hole in at least one of the walls to receive a fastener, and the walls defining a width for the socket measured across the opening, wherein the opening of the hitch socket is oriented relative to the vehicle so that an accessory may be extended into and removed from the hitch socket along a horizontal axis;

a bumper with an edge, the bumper attached to the vehicle so that the bumper is above the hitch socket and the edge faces away from the vehicle; and an ornamental cover including:

a plate with a first surface;

a decorative element on the first surface;

an insert connected to the plate and fittable into the opening, wherein the insert is conformed to the opening;

an elongate ear extending from the insert and being insertable into the hitch socket, the ear having a bore therethrough; and an external removable fastener extended through the hole in the wall of the hitch socket and through the bore of the ear to affix the ear within the socket and against one of the walls, and an internally threaded nutsert fitted within the bore, wherein the fastener may be threaded through the nutsert.

15. The ornamental cover of claim 14, wherein:

the plate is beneath the bumper; and the first surface of the plate faces away from the hitch socket and toward a vertical plane that includes the edge of the bumper.

* * * * *